United States Patent [19]

Krasinski et al.

[11] Patent Number: 4,577,940

[45] Date of Patent: Mar. 25, 1986

[54] MOIRE MICROSCOPE

[75] Inventors: Jerzy S. Krasinski, Green Brook; Donald F. Heller, Bound Brook, both of N.J.; Oded Kafri, Beer-sheva, Israel

[73] Assignee: Allied Corporation, Morris Township, N.J.

[21] Appl. No.: 683,832

[22] Filed: Dec. 19, 1984

[51] Int. Cl.⁴ .............................................. G02B 21/36
[52] U.S. Cl. ..................................... 350/502; 350/508; 350/527; 356/376
[58] Field of Search ............... 350/502, 507, 508, 509, 350/527, 576, 322, 319; 356/376, 128, 129; 250/237 G

[56] References Cited

U.S. PATENT DOCUMENTS 4,459,027  7/1984  Kafri et al. ........................ 356/376

OTHER PUBLICATIONS

R. W. Harrison, "Optical Flatness Technique . . . ", IBM Tech. Dis. Bull., vol. 12, No. 10, Mar., 1970, p. 1643.

F. A. Jenkins & H. E. White, *Fundamentals of Optics*, 4th Edition, New York, 1976, pp. 602–607.

F. Zernike, Z. Tech. Phys. 16, p. 454 (1935).

O. Kafri, "Noncoherent Method for Mapping Phase Objects", Optics Letters 5, 555, (1980).

*Primary Examiner*—Jon W. Henry
*Attorney, Agent, or Firm*—James Riesenfeld; Gerhard H. Fuchs

[57] ABSTRACT

A moire microscope comprises an objective lens, a collimating lens, and a pair of spaced-apart gratings arrayed along an optic axis and adapted for providing a magnified moire deflectogram of a phase object. The microscope provides a simple apparatus for preparing a map of optical thickness gradients, from which quantitative data concerning the object can be computed.

7 Claims, 8 Drawing Figures

MOIRE MICROSCOPE

BACKGROUND OF THE INVENTION

1. Field of the invention

This invention relates to an apparatus for microscopic analysis of phase objects, and, more particularly, to a microscope based on moire deflectometry.

2. Description of the Prior Art

The analysis of phase objects by optical methods has a long and interesting history. A large number of these methods have been developed and are in common use today. These include: interferometry (M. Born and E. Wolf, *Principle of Optics* (Pergamon, New York, 1970), pp. 256–370); holography; schlieren (F.A. Jenkins and H.E. White, *Fundamentals of Optics*, Fourth Edition, (McGraw-Hill, New York, 1976)); shadography (M. Born and E. Wolf, op. cit. p. 425; phase contrast (F. Zernike, Z. Tech. Phys. 16, 454 (1935); Physica 9, 686 (1942); and moire deflectometry (0. Kafri "Noncoherent Method for Mapping Phase Objects," Optics Letters 5, 555 (1980), and U.S. Pat. 4,459,027, issued July 10, 1984, to Kafri et al.). Optical analysis of phase objects has special significance in optical microscopy. In fact, phase contrast methods were originally developed for contrast enhancement in microscopy. Early applications permitted the detailed observation of difficult-to-stain biological samples. Today, applications of phase contrast microscopy extend to all fields of materials science, solid state physics, electrical engineering, and to more specialized areas, such as stress analysis and quality control.

Of the methods mentioned above, phase contrast, schlieren and interferometry have particular utility in microscopy. Both phase contrast and schlieren techniques are relatively simple to apply and can be readily adapted to nearly any existing microscope. However, both techniques are only semiquantitive; i.e., they do not give direct absolute measurements of phase distortion. In many applications, qualitative phase information is not always sufficient, but fully quantitative techniques such as interference microscopy can be both cumbersome to apply and expensive.

SUMMARY OF THE INVENTION

In accordance with the present invention, an apparatus for moire microscopy is provided. The apparatus comprises, in combination and spaced apart successively along an optic axis, (a) an objective lens for focusing a light beam from an object, (b) a collimating lens, for collimating the beam from the objective lens, and (c) two spaced-apart gratings for producing from the collimated beam a magnified moire deflectogram of the object.

The apparatus provides simplicity and cost advantages over phase contrast and schlieren systems. In addition, it is versatile, fully quantitative, and far less complex than interferometric devices.

DETAILED DESCRIPTION OF THE INVENTION

Moire deflectometry is a method for mapping ray deflection. It has proven useful for analysis of phase objects and reflective surfaces. Moreover, from the fringe contrast of the moire map, one can measure other properties, such as the modulation transfer function, turbulence, and beam quality. A moire deflectometer consists of a light source and a ray deflection analyzer (two spaced gratings and a viewing screen or camera). It is simple to construct and requires only a well-collimated light source, a less severe restriction than that required for interferometry. Specifically, moire deflectometry places no strong limitation on the number of longitudinal modes (temporal coherence) of the light source. Also, the sensitivity of the moire ray deflection analyzer is not fixed solely by the wavelength of light, but is adjustable by varying the grating pitch and/or spacing. Therefore, in typical applications, which are performed at reduced sensitivity, the moire deflectomer is fairly tolerant of both mechanical vibration and small aberrations in the system optics.

The achievable accuracy of a moire deflectometer is bounded, as is that of an interferometer, by the diffraction limit, i.e.:

$$dX \cdot d\phi > \lambda/2\pi \tag{1}$$

Here, $dX$ is the spatial resolution and $d\phi$ the angular resolution of the instrument and $\lambda$ is the wavelength of the light. Thus, in microscopy, as spatial resolution increases with the magnification, $M$, the resolving power of ray deflection decreases as $1/M$. However, for 100X magnification, angular measurements still may be made with an accuracy of $d\phi \sim 10^{-3}$ radians.

Figure 1:
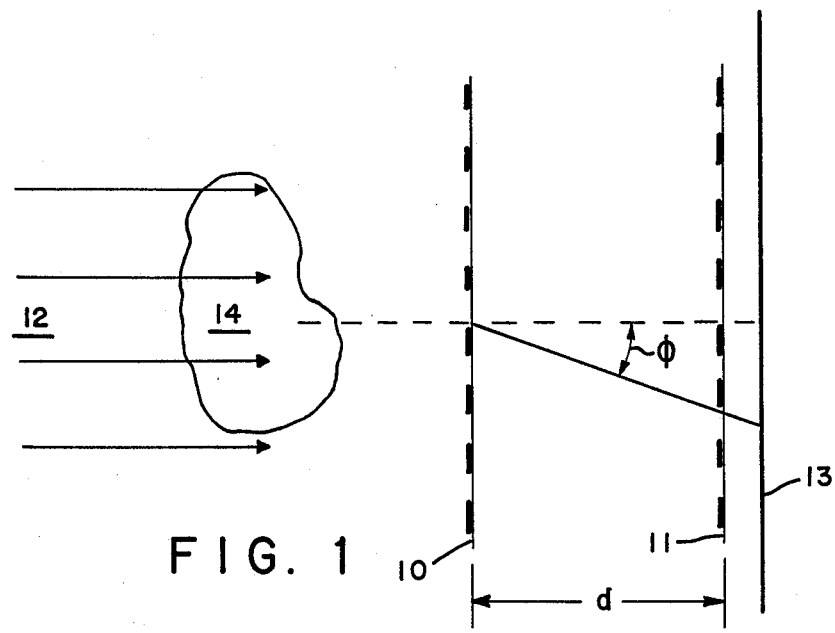
FIG. 1 is a schematic of a moire deflectometer.

The components of a prior art moire ray deflection analyzer are shown in FIG. 1. The analyzer includes two gratings, 10 and 11, (preferably Ronchi rulings) having a pitch p and separated by a distance d. The two gratings are oriented so that their lines are either parallel or rotated relative to each other by a small angle $\theta$. A collimated light beam 12 projects a shadow of the first grating onto the second and moire fringes are produced. The fringes can be imaged onto a matte screen 13. If a phase object 14 is placed in the beam path (or if the light is specularly reflected from an object) prior to the grating pair, the moire pattern on the screen is distorted. This distorted moire pattern can be analyzed to give a quantitative map of the ray deflection due to the object. For small distortions, the moire fringe shift h can be used to compute the corresponding local ray deflection angle $\phi$ according to:

$$\phi = h\theta/d. \tag{2}$$

Since the analyzer's spatial resolution can not be much better than the pitch of the gratings, a grating having at least 200 lines/mm would be required to resolve a 10

μm diameter spot if both were placed at the object plane of a microscope.

Figure 2:
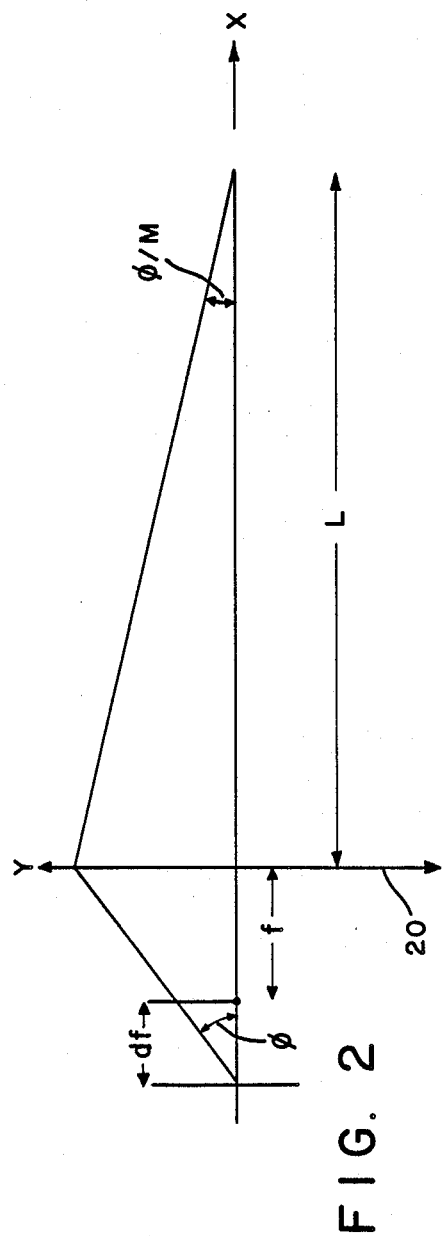
FIG. 2 is a ray diagram for an objective lens.

FIG. 2 shows a simplified schematic of a microscope. Objective lens 20 has a very short focal length f, typically several millimeters. The object is placed at a distance f+df from the lens, where df is a small displacement of the object from the focus. Its real magnified image appears at a distance L from the lens. If the object is illuminated by a collimated light beam and, at a given point $(-x,y)$ in the object space, a ray is deflected by some angle $\phi$, then a distance L away, at the corresponding point $(xM, -yM)$ in the image space, the apparent deflection angle is $\phi/M$. The magnification M is the ratio $L/(f+df)$.

Figure 3:
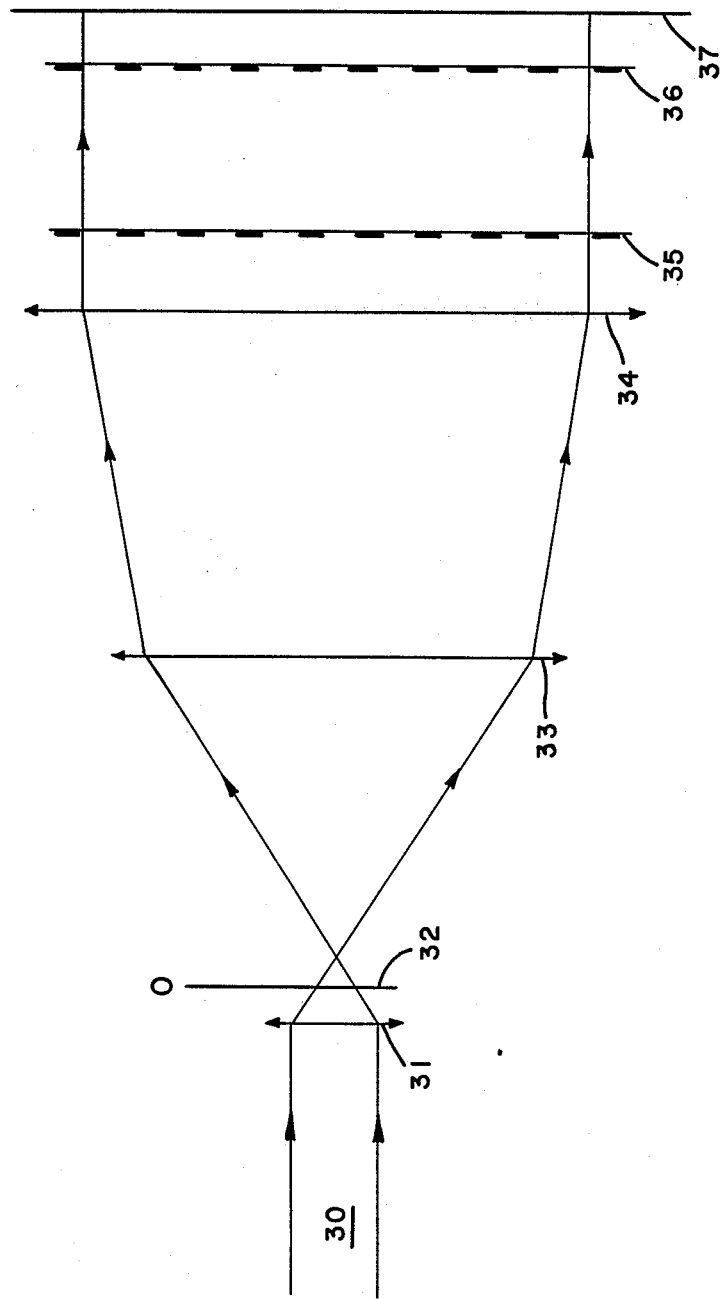
FIG. 3 depicts a schematic of a moire microscope of this invention.

FIG. 3 shows a schematic of a moire microscope of the present invention. Collimated beam 30 passes through optional condenser lens 31 and is incident on phase object 32. Beam 30 may be provided by a laser, such as a He-Ne laser, or by an incoherent source, such as a halogen lamp. The laser source provides better image quality and is preferred. After passing through objective lens 33 and collimating lens 34, the beam is incident on spaced gratings 35 and 36 at the image plane (assuming sufficient depth of field). Preferably, the gratings are mounted in holders that permit relative grating rotation about the optic axis. The distance between the gratings is preferably adjustable to provide control of the sensitivity (p/d) of the ray deflection analyzer. An image of the object with superimposed moire fringes is observed either on a matte screen 37 attached to the second grating or without the screen by using an eyepiece. By simply moving one of the gratings along the optic axis, a bright field image can be reversed to a dark field image. (In a phase contrast system, such a reversal requires that the optical system be changed.) The fringes may be photographed by methods well known in the art.

Figure 4:
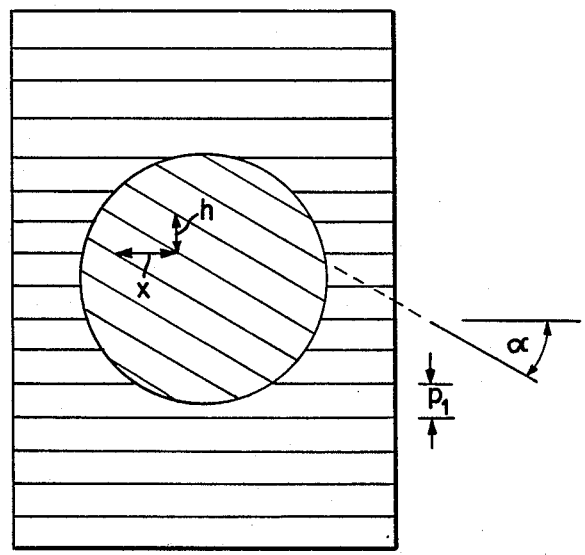
FIG. 4 is a schematic of a magnified moire deflectogram.

The method by which the moire pattern is analyzed can be understood by considering the schematic of a moire pattern shown in FIG. 4. The circular image area 40 corresponds to an object, such as 32 in FIG. 3. As before, the gratings have a pitch p and the distance between the gratings is equal to d. The moire pattern formed on screen 37 behind the second grating has a period of $p_1$. The period depends on the angle $\phi$ between the lines on the two gratings and is given by the equation $$p/p_1 = 2 \sin \theta/2 \tag{3}$$

For small $\theta$ we obtain $\theta = p/p_1$. The fringes formed by the rays passing through the object are rotated by an angle $\alpha$ with respect to the fringes outside the object. The rotation angle $\alpha$ is given by the relation $$\tan \alpha = h/x \tag{4}$$

The deflection angle $\phi$ (see FIG. 2) is given by $$\phi \approx x/f \tag{5}$$

The magnification system reduces the deflection by a factor of M, so the deflection equals $$\phi/M = x/M \cdot f \tag{6}$$

Combining (2) and (6), we obtain a formula for the "focal length" of an object measured by the moire microscope $$f = d/M\theta \tan \alpha \tag{7}$$

Figure 5:
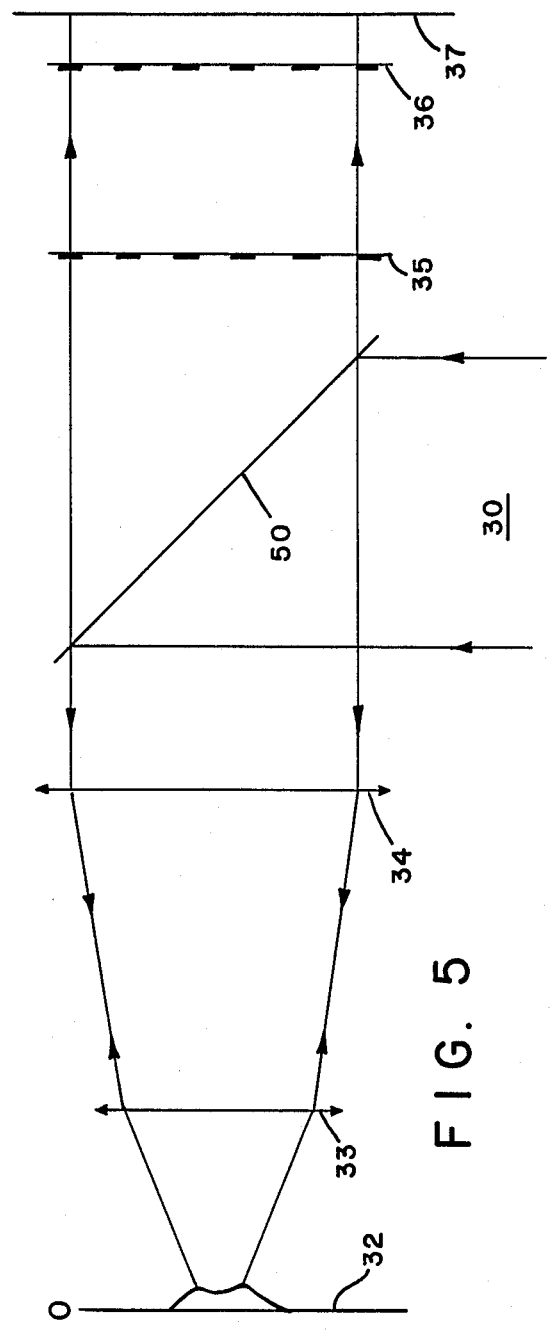
FIG. 5 is a schematic of another embodiment of this invention.

FIG. 5 shows a schematic of an apparatus of the present invention using a reflected light measurement. The apparatus is similar to that of FIG. 3, and the same reference numbers appear on the same elements; but a beam splitter 50 has been added in order to transmit the illuminating beam through the objective lens 33. The reflected beam is observed as before.

Figure 6B:
FIG. 6a and FIG. 6b show a transmission mode and a reflection mode deflectogram of an oil drop.
Figure 6A:
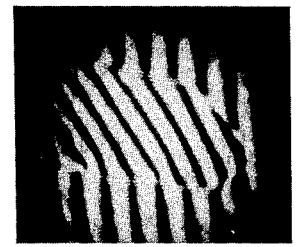

FIG. 6 shows two pictures of the same oil drop made (a) in a reflection mode and (b) in a transmission mode. The higher sensitivity (i.e. larger fringe rotation) of the reflecting system is apparent. Note that the fringes are rotated in opposite directions. In transmission, the drop acts as a lens having positive optical power, while in reflection the surface of the drop acts as a mirror having negative optical power. For a given surface curvature and refractive indices less than 2, the deflection angle is greater for reflected rays than for transmitted ones.

The following example is presented in order to provide a more complete understanding of the invention. The specific technique, conditions, and reported data set forth to illustrate the principles and practice of the invention are exemplary and should not be construed as limiting the scope of the invention.

EXAMPLE

Figure 7:
FIG. 7 is a magnified deflectogram of an oil drop at higher magnification.

In the apparatus of FIG. 3, a 1 mW He-Ne laser was used as a light source. Standard microscope condenser and objectives were used. A photograph of the object, a 0.2 mm diameter oil drop placed on the surface of a microscope slide, is shown in FIG. 7. The picture was taken using a 10X objective having a numerical aperture of 0.25. The field of view is 0.4 mm in diameter. The grating rulings had a pitch, p, of 0.085 mm and a spacing, d, of 105 mm. The fringe rotation of the moire deflectogram shown in the photo can be used to compute the effective local focal length of the phase object using equation (7) above. The local focal length for the part of the oil drop indicated by the arrow in FIG. 7 (i.e. the region in which the fringes are substantially parallel) is 9.5 cm.

We claim:

1. An apparatus for moire microscopy comprising, in combination and spaced apart successively along an optic axis,
    (a) an objective lens for focusing a light beam from an object,
    (b) a collimating lens, for collimating the beam from the objective lens, and
    (c) two spaced-apart gratings for producing from the collimated beam a magnified moire deflectogram of the object.

2. The apparatus of claim 1 in which rulings on one of the gratings are parallel to rulings on the other grating.

3. The apparatus of claim 1 in which one of the gratings is mounted so that it is rotatable about an axis that substantially coincides with the optic axis.

4. The apparatus of claim 1 further comprising means for making visible the deflectogram of the object.

5. The apparatus of claim 4 in which the means for making the deflectogram visible is a matte screen.

6. The apparatus of claim 4 in which the means for making the deflectogram visible includes a photosensitive material.

7. The apparatus of claim 1 further comprising a beam splitter between the collimating lens and the gratings.

* * * * *